United States Patent
Hanna et al.

(10) Patent No.: US 10,166,860 B2
(45) Date of Patent: Jan. 1, 2019

(54) MULTI-STAGE DETACHABLE HOOD AIR SCOOP ASSEMBLIES AND VEHICLES INCORPORATING THE SAME

(71) Applicant: TOYOTA MOTOR ENGINEERING & MANUFACTURING NORTH AMERICA, INC., Erlanger, KY (US)

(72) Inventors: Brandon H. Hanna, Troy, MI (US); James Cunningham, Clarkston, MI (US); Edgardo Reyes-Crespo, Ypsilanti, MI (US); Scott L. Frederick, Brighton, MI (US); Phouvadol Khouphongsy, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/423,696

(22) Filed: Feb. 3, 2017

(65) Prior Publication Data
US 2018/0170172 A1 Jun. 21, 2018

Related U.S. Application Data

(60) Provisional application No. 62/434,449, filed on Dec. 15, 2016.

(51) Int. Cl.
*B60K 13/02* (2006.01)
*B62D 25/12* (2006.01)
*B60K 11/06* (2006.01)

(52) U.S. Cl.
CPC .............. *B60K 13/02* (2013.01); *B60K 11/06* (2013.01); *B62D 25/12* (2013.01)

(58) Field of Classification Search
None
See application file for complete search history.

(56) References Cited

U.S. PATENT DOCUMENTS 4,291,911 A * 9/1981 Gallmeyer ........... B62D 35/005
        280/770
4,976,489 A * 12/1990 Lovelace ............. B62D 35/005
        296/180.1
5,143,516 A * 9/1992 Christensen ........... B60K 11/08
        123/41.44

(Continued)

FOREIGN PATENT DOCUMENTS

KR       100368411 B1      1/2003
KR       100368421 B1      1/2003
(Continued)

*Primary Examiner* — James A Shriver, II
*Assistant Examiner* — Hilary L Johns
(74) *Attorney, Agent, or Firm* — Dinsmore & Shohl LLP

(57) ABSTRACT

A vehicle includes a hood assembly that covers an engine compartment. A multi-stage detachable hood air scoop assembly is connected to the hood assembly. The multi-stage detachable hood air scoop assembly includes an intake component connected directly to the hood assembly. A cover component is releasably connected to the intake component and directly to the hood assembly using releasable connections such that the cover component detaches from the intake component and the hood assembly in response to a predetermined front impact force.

17 Claims, 13 Drawing Sheets

(56) References Cited

U.S. PATENT DOCUMENTS

| | | | | |
|---|---|---|---|---|
| 5,269,264 | A * | 12/1993 | Weinhold | B60K 11/085 123/198 E |
| 5,724,925 | A * | 3/1998 | Ito | B60K 11/02 123/41.49 |
| 6,230,832 | B1 * | 5/2001 | von Mayenburg | B60K 11/08 180/68.1 |
| 6,832,644 | B2 * | 12/2004 | Stauder | F01P 7/10 123/41.04 |
| 7,051,786 | B2 * | 5/2006 | Vuk | B60K 11/04 165/122 |
| 7,055,638 | B2 * | 6/2006 | Khalighi | B62D 35/005 180/116 |
| 7,143,852 | B2 * | 12/2006 | Yatsuda | B62D 25/10 180/69.2 |
| 7,182,047 | B1 * | 2/2007 | Schwartz | F01P 5/06 123/41.04 |
| 7,451,844 | B2 * | 11/2008 | Kunikata | B60K 11/04 180/68.1 |
| 7,686,382 | B2 * | 3/2010 | Rober | B62D 35/007 296/180.1 |
| 8,312,949 | B2 * | 11/2012 | Hirukawa | B60K 11/08 180/68.1 |
| 8,434,579 | B2 * | 5/2013 | Widmer | B62D 25/084 180/68.1 |
| 8,479,852 | B2 * | 7/2013 | Maurer | F28F 13/06 165/41 |
| 8,579,358 | B2 * | 11/2013 | Meeks | B62D 35/005 180/903 |
| 8,708,075 | B2 * | 4/2014 | Maurer | B60R 19/52 180/68.1 |
| 8,887,845 | B2 * | 11/2014 | McDonald | B62D 35/005 180/68.1 |
| 2006/0048986 | A1 * | 3/2006 | Bracciano | B60H 1/28 180/69.2 |
| 2011/0120791 | A1 * | 5/2011 | Greenwood | B60K 11/04 180/68.1 |
| 2014/0076645 | A1 * | 3/2014 | McDonald | B62D 35/005 180/68.1 |

FOREIGN PATENT DOCUMENTS

| | | |
|---|---|---|
| KR | 100380471 B1 | 4/2003 |
| KR | 100380472 B1 | 4/2003 |

* cited by examiner

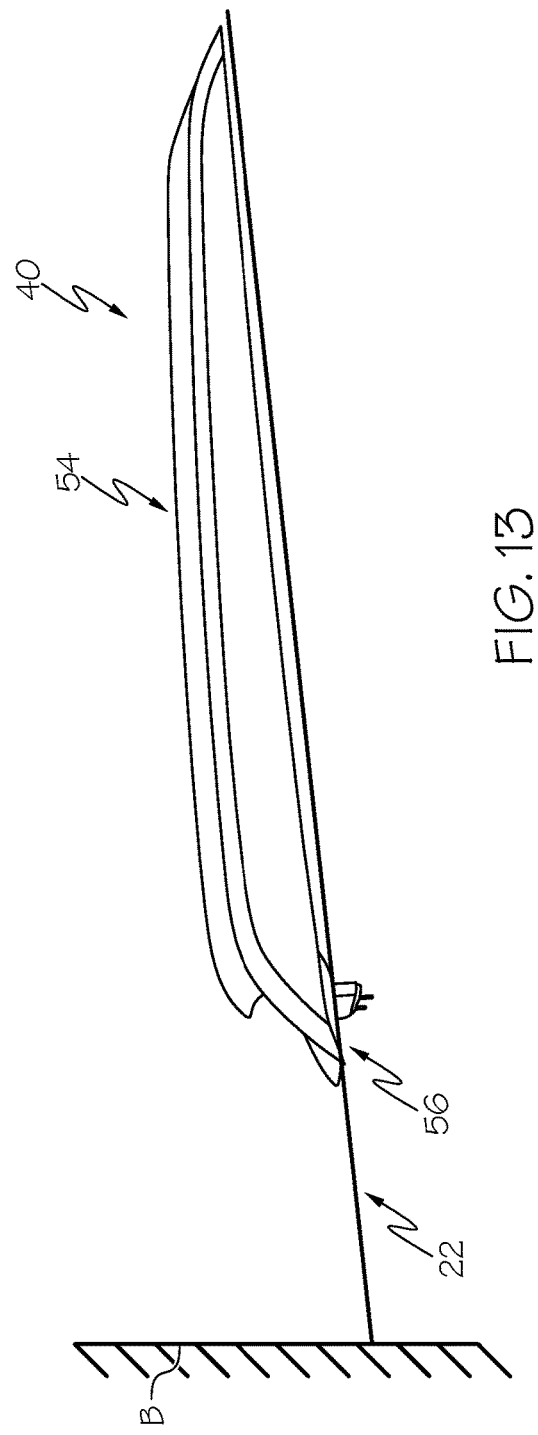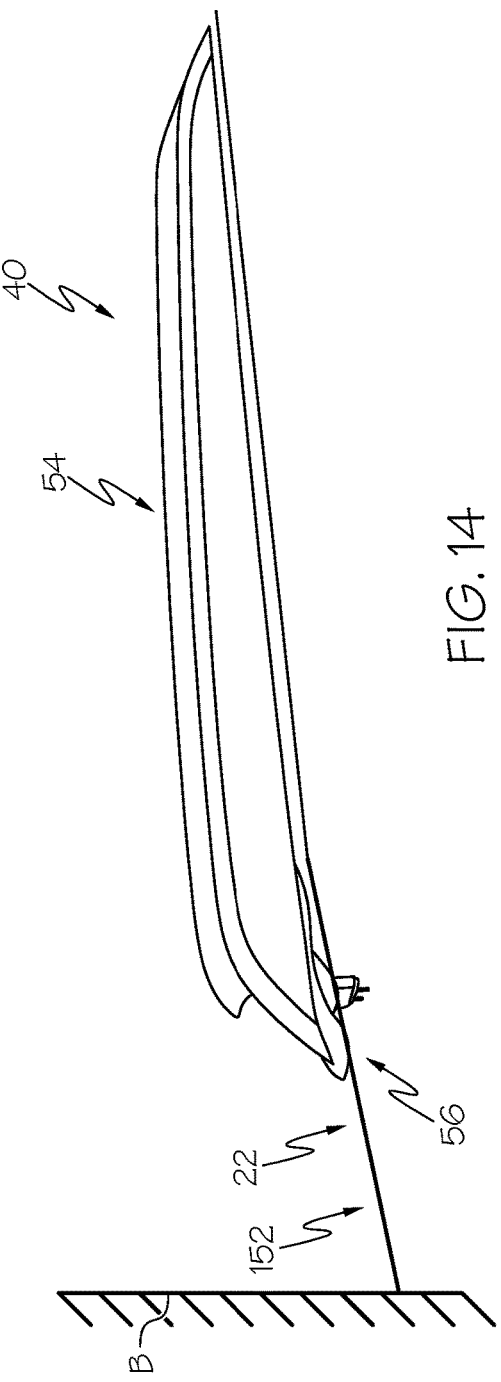

US 10,166,860 B2

MULTI-STAGE DETACHABLE HOOD AIR SCOOP ASSEMBLIES AND VEHICLES INCORPORATING THE SAME

CROSS-REFERENCE TO RELATED APPLICATIONS

This application claims the benefit of U.S. Provisional Patent Application No. 62/434,449, filed on Dec. 15, 2016, hereby incorporated in its entirety.

TECHNICAL FIELD

The present specification generally relates to hood air scoop assemblies for vehicles and, more specifically, to vehicles and multi-stage detachable hood air scoop assemblies.

BACKGROUND

Hood air scoop assemblies can provide vehicles with a desired appearance and improved performance by allowing increased airflow into an engine compartment. In some instances, the air scoop assemblies may only provide a desired appearance where there is no delivery of air through a hood assembly of the vehicle into the engine compartment. In other words, some air scoop assemblies may be non-functional for allowing air into the engine compartment. In either case, hood air scoop assemblies, by their presence, may affect impact performance of the hood assembly during impact testing.

Accordingly, a need exists for alternative hood air scoop assemblies that, by their presence, do not unduly alter impact performance of the hood assemblies.

SUMMARY

In one embodiment, a vehicle includes a hood assembly that covers an engine compartment. A multi-stage detachable hood air scoop assembly is connected to the hood assembly. The multi-stage detachable hood air scoop assembly includes an intake component connected directly to the hood assembly. A cover component is releasably connected to the intake component and directly to the hood assembly using releasable connections such that the cover component detaches from the intake component and the hood assembly in response to a predetermined front impact force.

In another embodiment, a multi-stage detachable hood air scoop assembly that connects to a hood assembly of a vehicle includes an intake component that connects directly to the hood assembly. A cover component releasably connects to the intake component and directly to the hood assembly using releasable connections such that the cover component detaches from the intake component and the hood assembly in response to a predetermined front impact force.

In another embodiment, a method of providing a multi-stage detachable hood air scoop assembly for a hood assembly of a vehicle is provided. The method includes connecting an intake component directly to the hood assembly. A cover component is connected directly to the hood assembly and the intake component. The cover component is connected to the hood assembly and the intake component using releasable connections such that the cover component detaches from the intake component and the hood assembly in response to a predetermined front impact force.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 13 illustrates operation of the multi-stage detachable hood air scoop assembly during a frontal impact event, according to one or more embodiments shown and described herein;

FIG. 14 illustrates operation of the multi-stage detachable hood air scoop assembly during a frontal impact event, according to one or more embodiments shown and described herein;

DETAILED DESCRIPTION

Embodiments described herein generally relate to vehicles and multi-stage detachable hood air scoop assemblies that at least partially detach from a vehicle hood assembly as the hood assembly deforms due to a frontal impact. The multi-stage detachable hood air scoop assemblies include an intake component and a cover component. Both the intake component and the cover component may be connected to the hood assembly. The cover component may be releasably connected to the intake component so that the cover component can release from the intake component in a predetermined fashion. The cover component may also be releasably connected to the hood assembly to also release therefrom in a predictable fashion. Such a releasable, multi-component hood air scoop arrangement can allow the cover component to completely detach from both the intake component and the hood assembly during an impact thereby reducing influence of the cover component on impact performance characteristics of the hood assembly.

Figure 1:
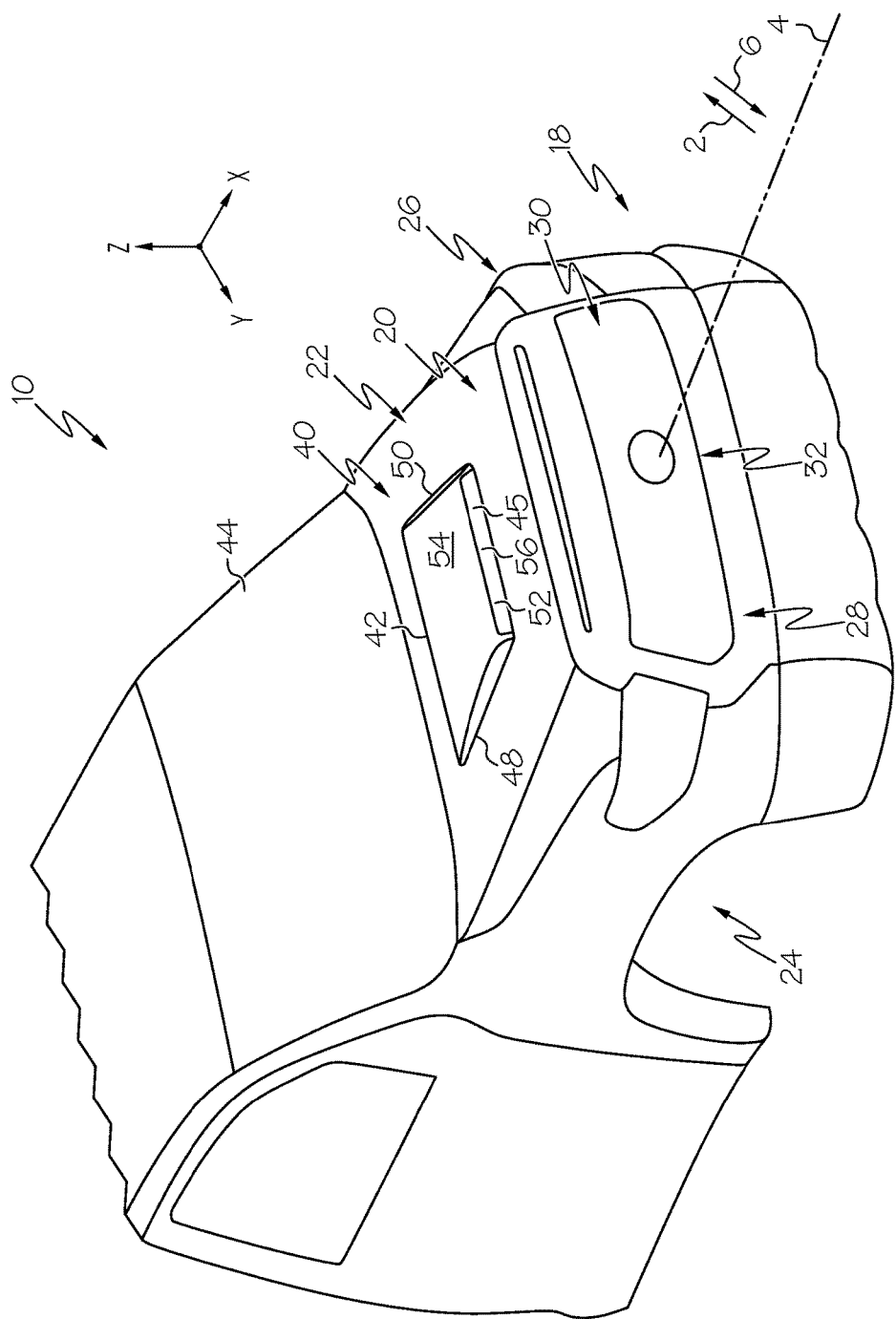
FIG. 1 depicts a perspective view of a vehicle including a multi-stage detachable hood air scoop assembly, according to one or more embodiments shown and described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

While FIG. 1 depicts the vehicle 10 as a sport-utility vehicle (SUV), it may be recognized that the vehicle 10 may be other vehicle types such as a sedan, coupe, pick-up truck, or the like in various other embodiments. The vehicle 10 may include an engine compartment 20 located at a front 18 of the vehicle. In some embodiments, the engine compartment 20 may be at least partially enclosed by various vehicle components. Illustrative components that may be used to enclose the engine compartment 20 may include, but are not limited to, a hood assembly 22, one or more fenders 24 and 26, and a front bumper assembly 28. For example, the engine compartment 20 may be enclosed on four sides by the hood assembly 22, the front bumper assembly 28, and the passenger side and driver side fenders 24 and 26 which are attached to front side members that form the sides of the engine compartment 20. The engine compartment 20 may generally be a hollow cavity beneath the hood assembly 22 that houses various components of the vehicle 10, such as, for example, the engine and/or motor, cooling systems (e.g., a radiator), electrical systems and/or the like. Various other parts and components of the vehicle, such as body panels, bumpers, suspension components, etc. may be attached to the vehicle either in the engine compartment 20 or through the front side members.

In various embodiments, a portion of the engine compartment 20 may be open at the front bumper assembly 28 to allow air to flow into the engine compartment and to protect the radiator engine/motor of the vehicle. Such an opening 30 may assist in cooling various vehicle components, particularly components located in the engine compartment 20. In some embodiments, the opening 30 may be located at or near the front 18. When the opening 30 is located on the front 18, it may allow for airflow into the engine compartment 20, particularly when the vehicle 10 is in forward motion. Airflow movement into the engine compartment 20 may generally provide circulation to assist with cooling various vehicle components located in the engine compartment. In addition to air, other debris may enter the engine compartment 20 via the opening 30 if the opening is not appropriately shielded. Thus, in some embodiments, a grille assembly 32 may be positioned in the opening 30. The grille assembly 32 may prevent debris such as leaves, paper, road waste, animals, insects, and/or the like from entering the engine compartment 20 and interfering with and/or damaging various vehicle components. Additionally, the grille assembly 32 may be constructed so as to not hinder and even aid the flow of air into the engine compartment 20. In some embodiments, the grille assembly 32 may also serve as an aesthetic embellishment containing indicia, trim, and/or the like.

A multi-stage detachable hood air scoop assembly 40 is connected to the hood assembly 22. The multi-stage detachable hood air scoop assembly 40 has a rearward facing side 42 (facing windshield 44), a frontward facing side 45 and laterally facing sides 48 and 50 that extend between the frontward facing and rearward facing sides 45 and 42. A scoop assembly opening 52 is provided at the frontward facing side 45 of the multi-stage detachable hood air scoop assembly 40. The scoop assembly opening 52 is provided between a cover component 54 and an intake component 56, which will be described in greater detail below.

Figure 2:
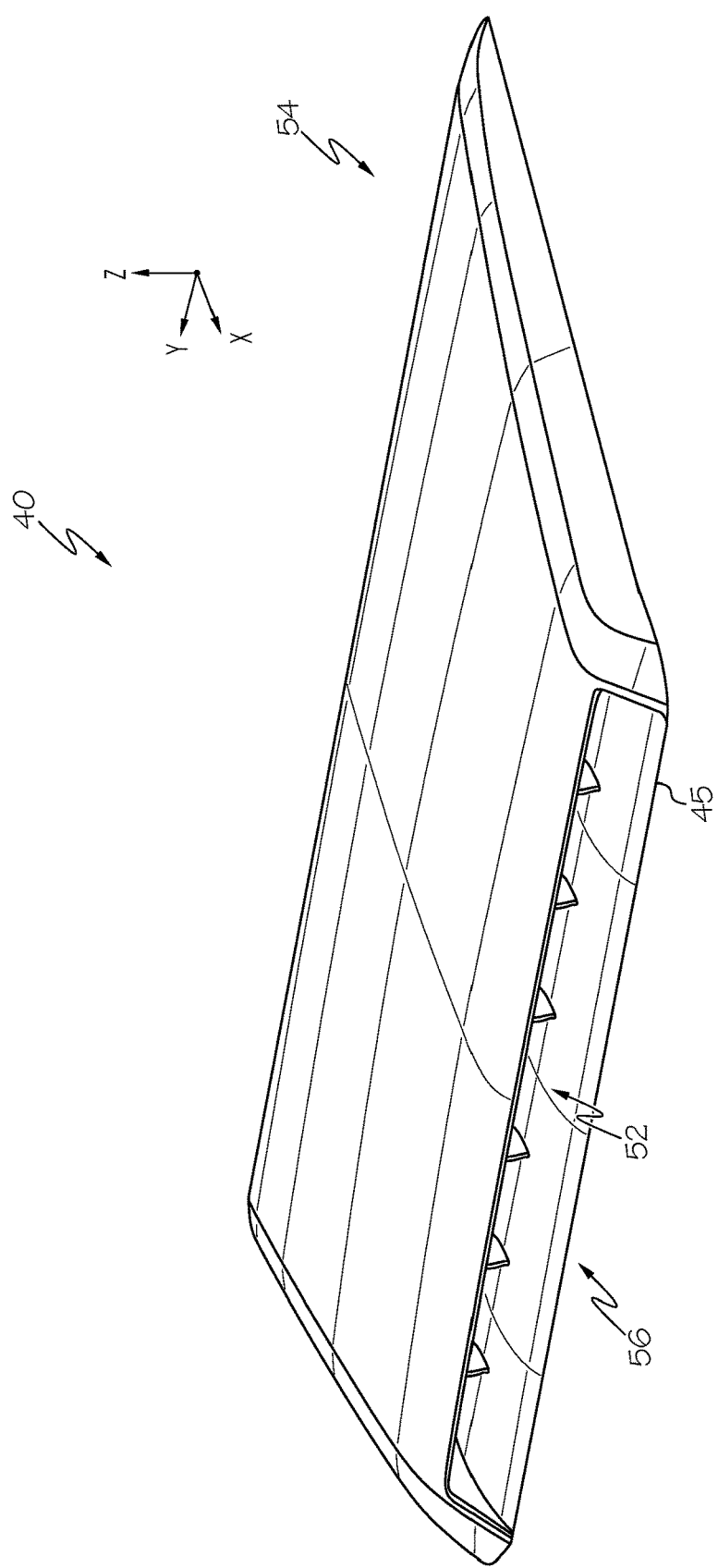
FIG. 2 depicts a perspective view of the multi-stage detachable hood air scoop assembly of FIG. 1 in isolation.

Referring to FIG. 2, the multi-stage detachable hood air scoop assembly 40 is shown in isolation and includes the cover component 54 that is releasably connected to the intake component 56. The frontward facing side 45 of multi-stage detachable hood air scoop assembly 40 has the scoop assembly opening 52 that is located between the cover component 54 and the intake component 56. The multi-stage detachable hood air scoop assembly 40 generally increases in width in the vehicle lateral direction from the frontward facing side 45 to the rearward facing side 42. However, any suitable shape may be selected for the multi-stage detachable hood air scoop assembly 40. Further, the cover component 54 decreases in height in the vehicle longitudinal direction from the frontward facing side 45 to the rearward facing side 42 to provide a foil-like, aerodynamic appearance.

Figure 3:
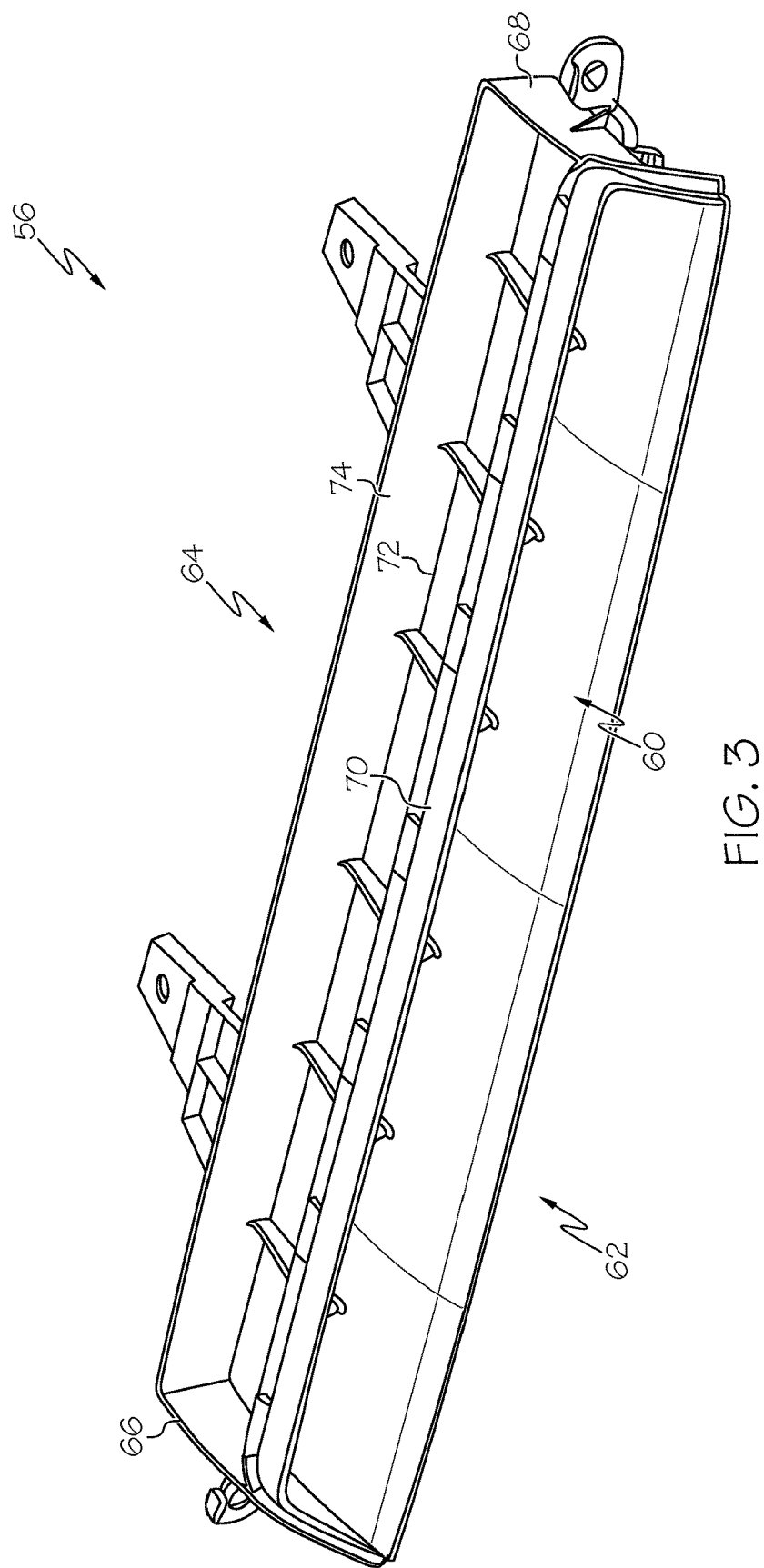
FIG. 3 depicts a perspective view of an intake component for use in the multi-stage detachable hood air scoop assembly of FIG. 1, according to one or more embodiments shown and described herein.

Referring to FIG. 3, the intake component 56 is illustrated in isolation and includes an intake component body 60 having a front portion 62, a rear portion 64 and outboard sides 66 and 68 extending between the front portion 62 and the rear portion 64. A cover support 70 extends between the outboard sides 66 and 68. The cover support 70 may be a support beam that engages the cover component 54 and resists movement of the cover component 54 into the scoop assembly opening 52. An array of fins 72 may extend between the cover support 70 and the intake component body 60. In some embodiments, a rear wall 74 may extend between the outboard sides 66 and 68, rearward of the cover support 70. In some embodiments, the rear wall 74 may engage an interior of the cover component 54 to inhibit the passage of air thereby and further into the interior of the multi-stage detachable hood air scoop assembly 40, e.g., where the multi-stage detachable hood air scoop assembly 40 is not in communication with the engine compartment 20. In other embodiments, the rear wall 74 may not be present where the multi-stage detachable hood air scoop assembly 40 is in communication with an opening in the hood assembly to direct air into the engine compartment 20.

Figure 4:
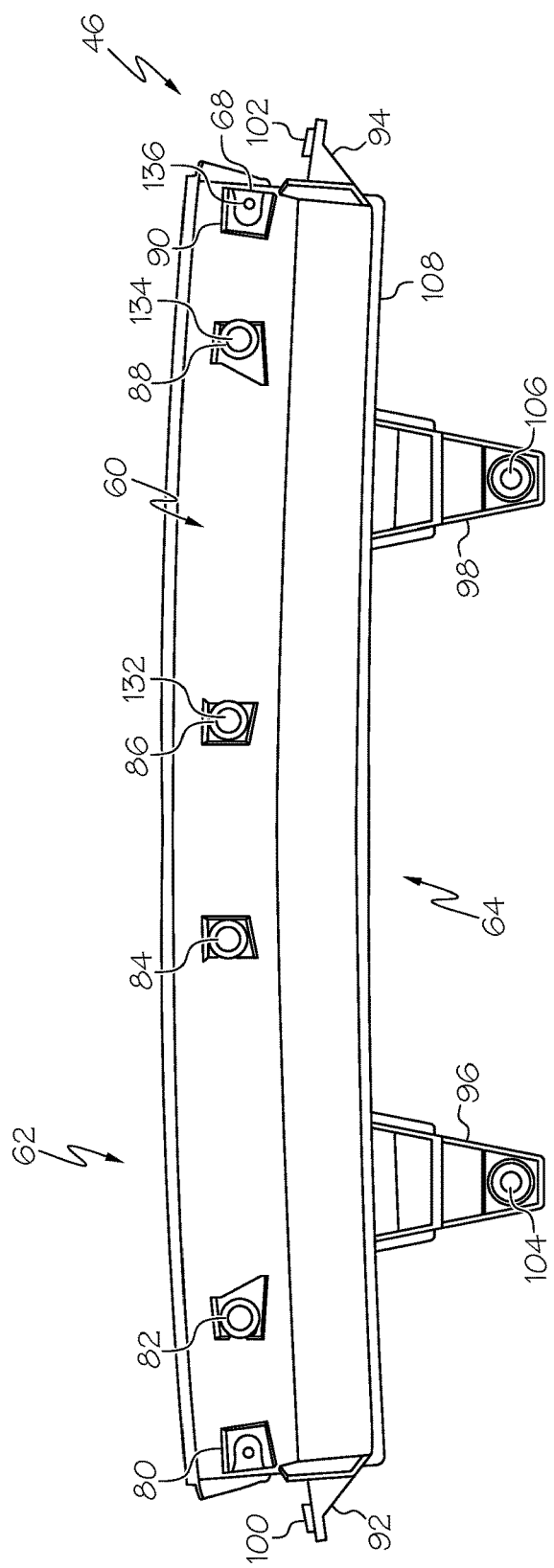
FIG. 4 depicts a bottom view of the intake component of FIG. 3.

FIG. 4 illustrates a bottom view of the intake component 46. As described above, the intake component body 60 includes the front portion 62 and the rear portion 64. The front portion 62 of the intake component body 60 connects directly to the hood assembly 22 while the rear portion 64 connects directly to the cover component 54 and indirectly to the hood assembly through the cover component 54, which will be described in greater detail below. The front portion 62 includes a plurality of fastening locations 80, 82, 84, 86, 88 and 90. The fastening locations 80, 82, 84, 86, 88 and 90 are downwardly facing in the vehicle vertical direction toward the hood assembly 22 and are spaced-apart along a width of the intake component body 60 in the vehicle lateral direction. In the illustrated example, fastening locations 80, 82, 88 and 90 are outermost fastening locations and fastening locations 84 and 86 are innermost fastening locations.

The rear portion 64 of the intake component body 60 connects directly to the cover component 54. The rear portion 64 includes side fastening aims 92 and 94 and rear fastening arms 96 and 98, where each of the fastening arms 92, 94, 96 and 98 includes a respective fastening location 100, 102, 104 and 106. Unlike the fastening locations 80, 82, 84, 86, 88 and 90 of the front portion 62 which are located directly on the intake component body 60, the fastening locations 100, 102, 104 and 106 of the rear portion 64 are located away from and are connected to the intake component body 60 by the fastening arms 92, 94, 96 and 98. In particular, the side fastening arms 92 and 94 extend outwardly from respective outboard sides 66 and 68 in the vehicle lateral direction, while the rear fastening arms 96 and 98 extend outwardly from a rear edge 108 of the rear portion 64 in the vehicle longitudinal direction.

Figure 5:
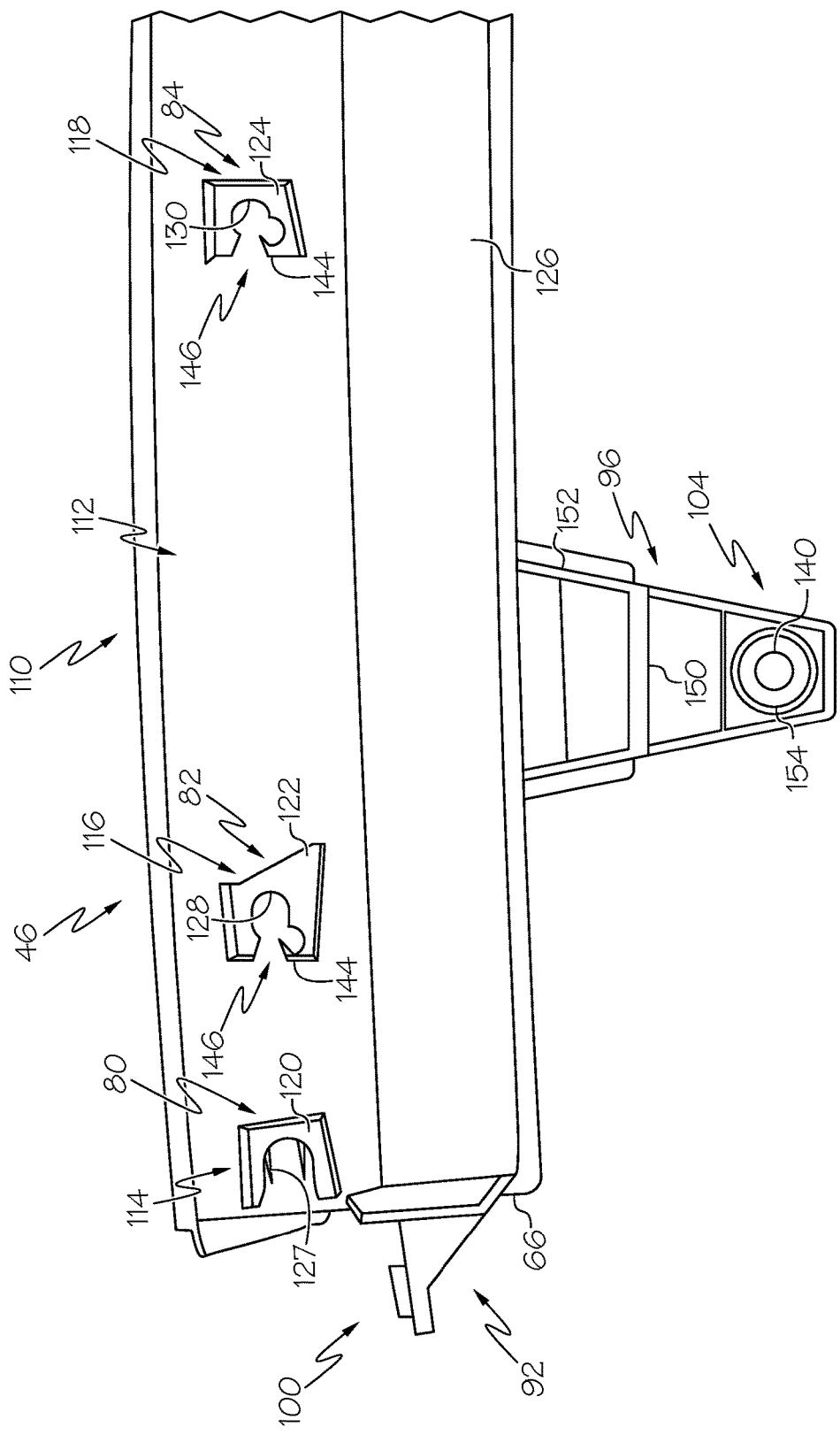
FIG. 5 depicts a detail bottom view of the intake component of FIG. 3.

Referring now to FIG. 5, a detail view of an outboard portion 110 of bottom 112 of the intake component 46 is shown. The fastening locations 80, 82 and 84 are each formed by a fastener head catch structure 114, 116 and 118. The fastener head catch structures 114, 116 and 118 each have a catch wall 120, 122, 124 that is spaced from and generally parallel to a bottom surface 129 of the intake component body 60 thereby defining a space therebetween that is sized to receive a fastener head of a fastener. A stem of the fasteners may be received by a slot structure 127, 128 and 130 that are formed through the catch walls 120, 122 and 124. The slot structures 127, 128 and 130 may be open to the outboard side 66. Similarly, slot structures 132, 134 and 136 (FIG. 4) may be open to the opposite outboard side 68. Such an oppositely open slot arrangement can further secure the intake component 46 in the vehicle lateral direction. Additionally, the slot structures 127, 128, 130, 132, 134 and 136 may include a snap lock structure 144 that can decrease a width at a necked-down portion 146 of at least some of the slot structures 127, 128, 130, 132, 134 and 136. The snap lock structures 144 may be resiliently flexible to allow the stem portions of the fasteners to be inserted through the necked-down portions 146 and can be used to secure the stem portions and head portions of the fasteners within the slot structures 127, 128, 130, 132, 134 and 136.

The fastening locations 100, 102, 104 and 106 are each formed by the side fastening arms 92 and 94 and the rear fastening arms 96 and 98, respectively. The fastening locations 100, 102, 104 and 106 may each include a fastener receiving opening 140 that, unlike the slot structures 127, 128, 130, 132, 134 and 136 are closed openings. In other embodiments, the fastening locations 100, 102, 104 and 106 may include open-ended slots similar to those described above.

Figure 6:
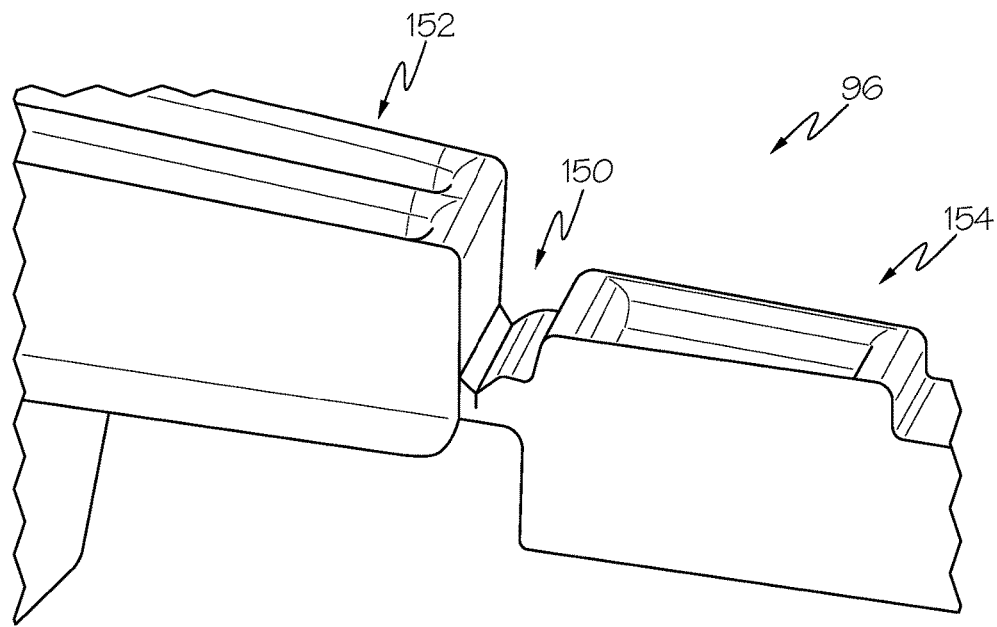
FIG. 6 depicts a section view of a rear fastening arm of the intake component of FIG. 3, according to one or more embodiments shown and described herein.

Referring also to FIG. 6, the rear fastening arm 96 is illustrated and includes a line of weakness 150 that is formed along a width of the rear fastening arm 96 in the vehicle lateral direction. The rear fastening arm 98 can include the same features. The line of weakness 150 may be formed as a thinned material region that extends continuously along the width of the rear fastening arm 96. Other weakness structures may be used such as openings and/or perforations. The line of weakness 150 divides the rear fastening aim 96 into a connected portion 152 that is connected to the intake component body 60 and a free portion 154 extending longitudinally therefrom. The fastening location 104 is located at the free portion 154 for connecting to the cover component 54.

Figure 7:
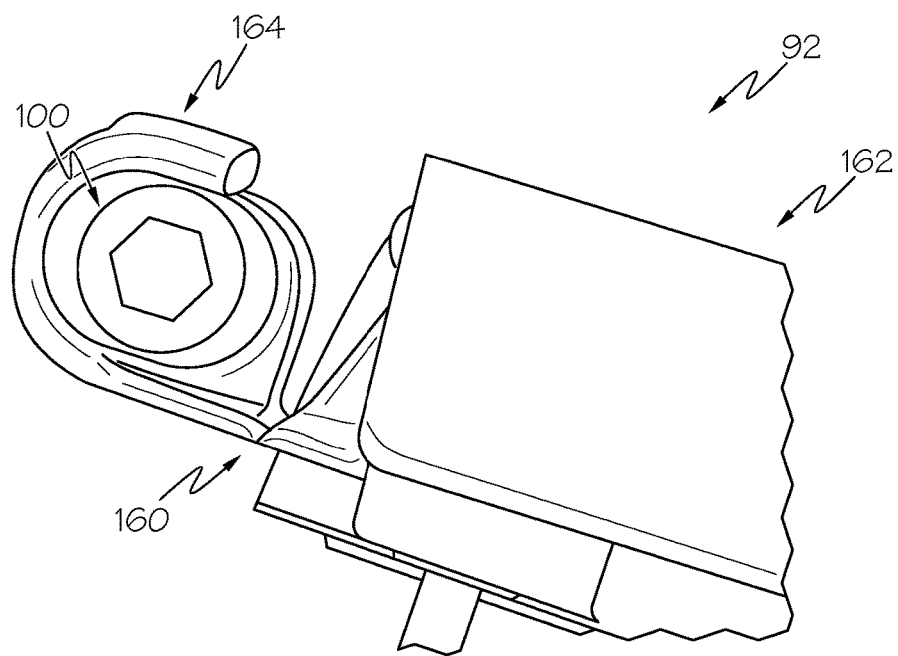
FIG. 7 depicts a section view of a side fastening arm of the intake component of FIG. 3, according to one or more embodiments shown and described herein.

Referring to FIG. 7, the side fastening arm 92 also includes a line of weakness 160 that is formed along a length of the side fastening arm 92 in the vehicle longitudinal direction. The side fastening arm 94 can include the same features. The line of weakness 160 may be formed as a thinned material region that extends continuously along the length of the side fastening arm 92. Other weakness structures may be used such as openings and/or perforations. The line of weakness 160 divides the side fastening arm 92 into a connected portion 162 that is connected to the intake component body 60 and a free portion 164 extending laterally therefrom. The fastening location 100 is located at the free portion 164 for connecting to the cover component 54.

Figure 8:
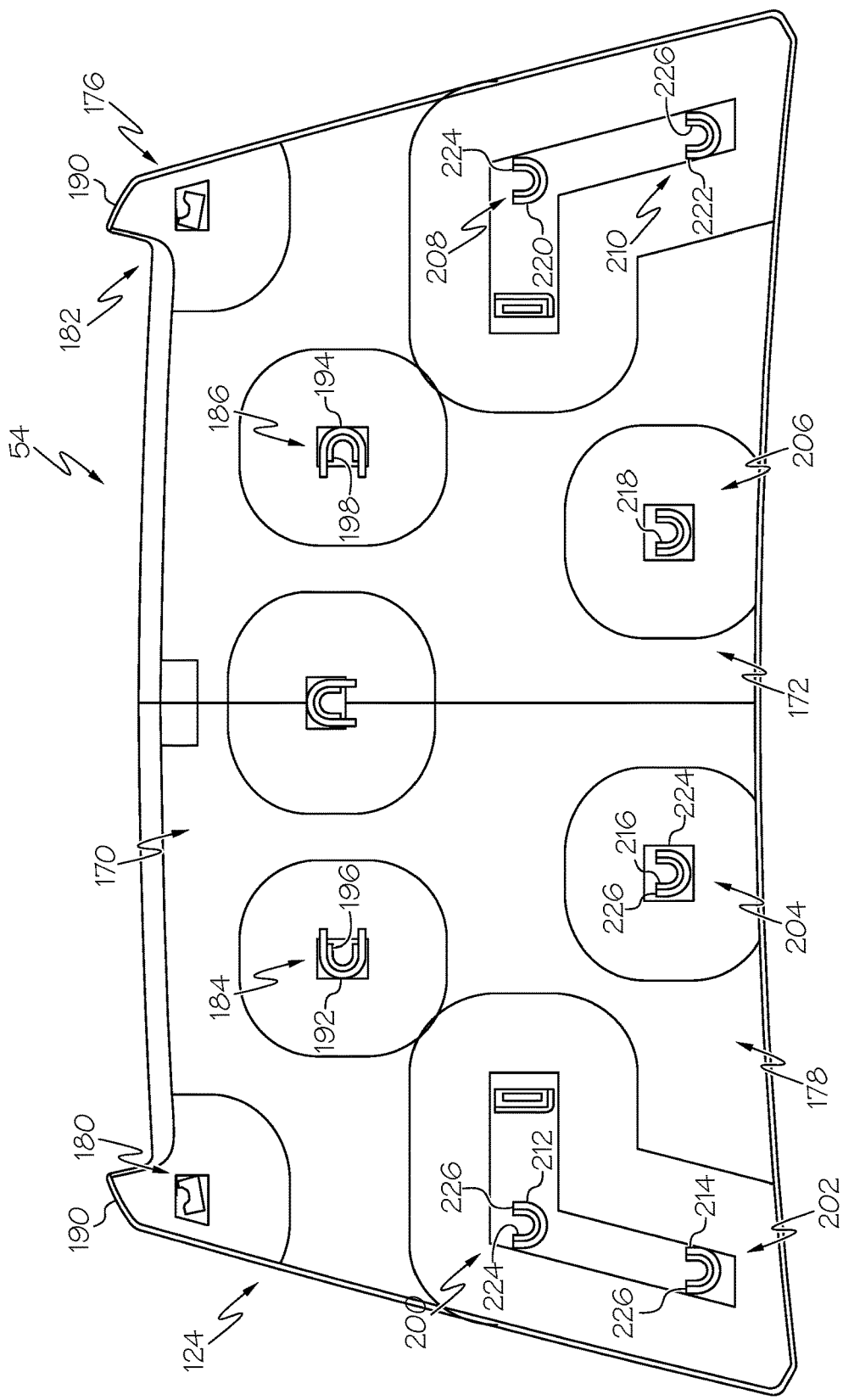
FIG. 8 depicts a bottom view of a cover component for use in the multi-stage detachable hood air scoop assembly of FIG. 1, according to one or more embodiments shown and described herein.

Referring to FIG. 8, the cover component 54 is illustrated in isolation and includes a front portion 170, a rear portion 172 and outboard sides 174 and 176 extending between the front portion 170 and the rear portion 172. The outboard sides 174 and 176 are generally turned away from a body portion 178 to form somewhat of a U-shape. The front portion 170 connects directly to the intake component 46 and indirectly to the hood assembly 22 through the intake component 46 while the rear portion 172 connects directly and releasably to the hood assembly 22. The front portion 170 includes a plurality of fastening locations 180, 182, 184 and 186. The fastening locations 180, 182, 184 and 186 are arranged to connect to the fastening locations 100, 102, 104 and 106 at the rear portion 64 of the intake component 46. In particular, The fastening location 180 mates with the fastening location 100 provided by the side fastening arm 92 and the fastening location 182 mates with the fastening location 102 provided by the side fastening arm 94. The fastening location 184 mates with the fastening location 104 provided by the rear fastening arm 96 and the fastening location 186 mates with the fastening location 106 provided by the rear fastening arm 98.

The fastening locations 180 and 182 may include fastener receiving openings 190 that align with the fastener receiving openings 140 of the side fastening arms 92 and 94. In the illustrated embodiment, the fastening locations 184 and 186 include fastener head catch structures 192 and 194 that include slot structures 196 and 198 that are sized to receive fastener heads of fasteners. The slot structures 196 and 198 are arranged to align with the fastener receiving openings 140 of the rear fastening aims 96 and 98. As indicated above, the connections between the side fastening arms 92 and 94 and the intake component 56 and the rear fastening arms 96 and 98 and the intake component 56 are releasable due to the presence of the lines of weakness 150 and 160 which allows the cover component 54 to release from the intake component 56 upon application of a predetermined tensile force.

The rear portion 172 of the cover component 54 includes fastening locations 200, 202, 204, 206, 208 and 210 that are arranged to connect to fasteners connected directly to the hood assembly 22. In the illustrated embodiment, the fastening locations 200, 202, 204, 206, 208 and 210 include fastener head catch structures 212, 214, 216, 218, 220 and 222 that include slot structures 224 that are sized to receive fastener heads of fasteners. As can be seen, the slot structures 224 all have open ends 226 that are all aligned in the same vehicle longitudinal direction and open toward the front portion 170 of the cover component 54. As will be described below, the alignment of the open ends 226 of the slot structures 224 allows the cover component 54 to release from the hood assembly 22 while the cover component 54 releases from the intake component 56.

Figure 9:
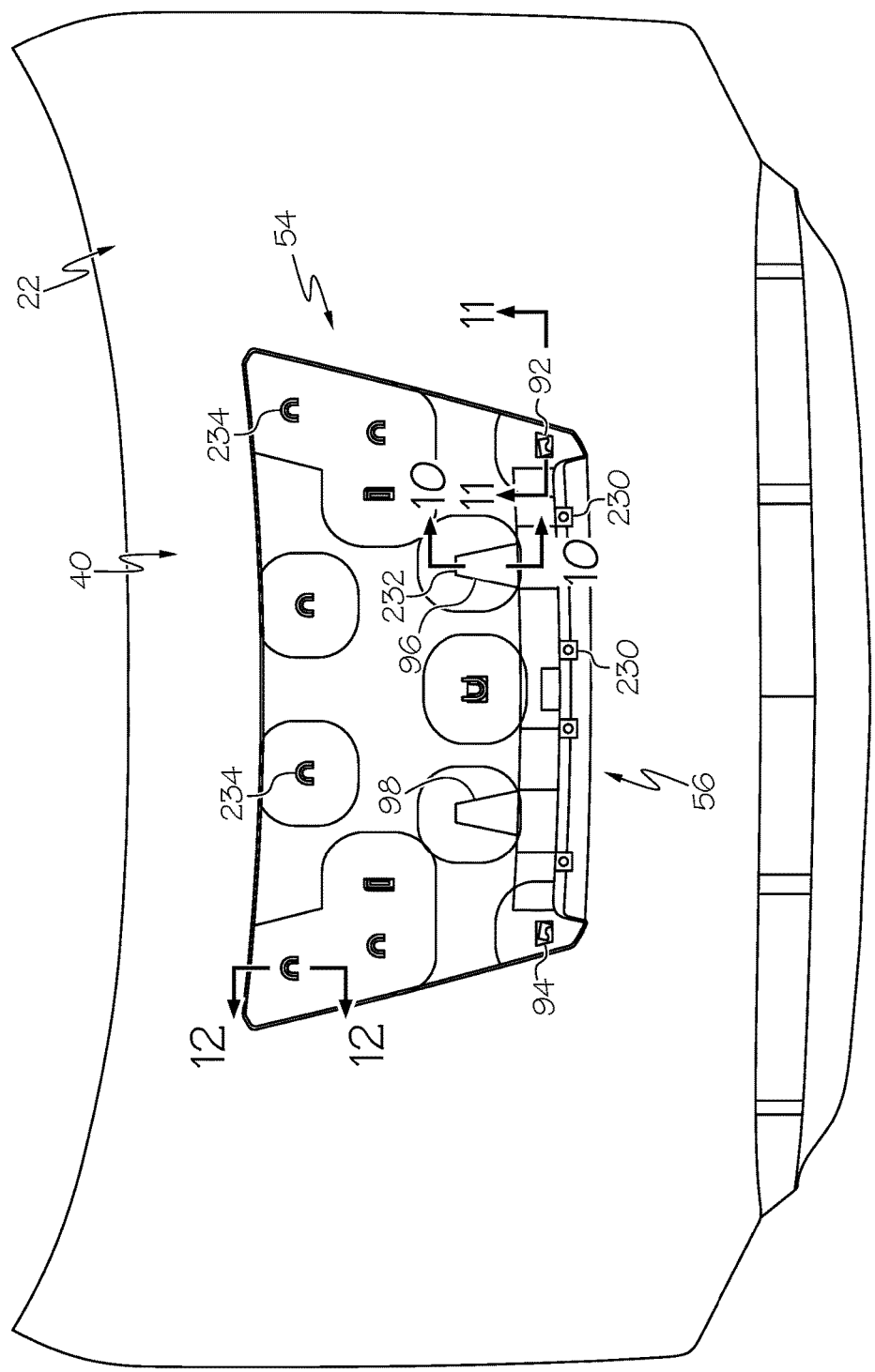
FIG. 9 is a bottom view of a hood assembly including the multi-stage detachable hood air scoop assembly of FIG. 1, according to one or more embodiments shown and described herein.

Referring briefly to FIG. 9, a bottom view of the hood assembly 22 connected to the multi-stage detachable hood air scoop assembly 40 through the hood assembly 22 is illustrated. As can be seen, the intake component 56 is connected directly to the hood assembly 22 using fasteners 230 that are connected to both the hood assembly 22 and the intake component 46 in a non-releasable fashion. As used herein, the term "non-releasable fashion" refers to a connection that is not intended to be releasable under a predetermined force. The intake component 56 is connected directly to the cover component 54 through the side fastening arms 92 and 94 and the rear fastening arms 96 and 98 using fasteners 232 also in a non-releasable fashion. However, as discussed above, the side fastening arms 92, 94 and the rear fastening arms 96, 98 include the lines of weakness 150 and 160 (FIGS. 6 and 7) that provide the releasable connection between the cover component 54 and the intake component 56. The cover component 54 is connected directly to the hood assembly using fasteners 234 in a releasable fashion. Thus, both the cover component 54 and the intake component 56 are connected directly to the hood assembly 22 and are connected indirectly to the hood assembly 22 through each other.

Figure 10:
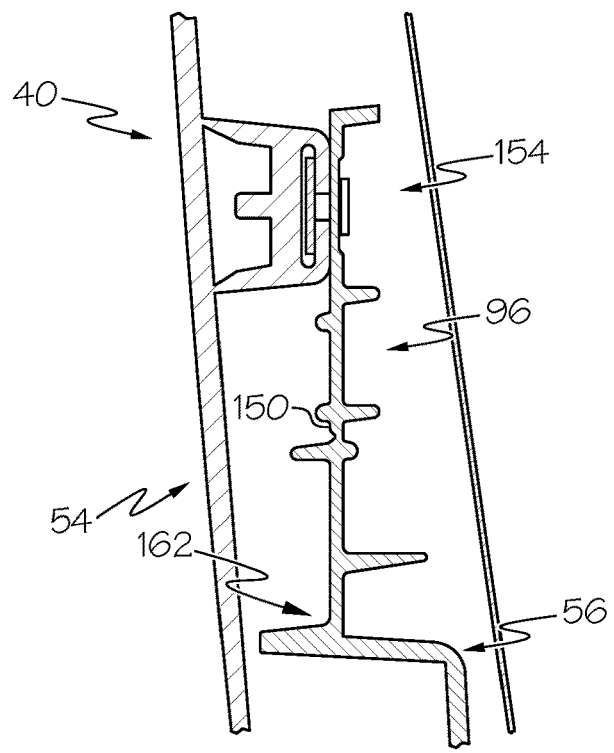
FIG. 10 depicts a section view of the rear fastening arm along line 10-10 of FIG. 9.
Figure 11:
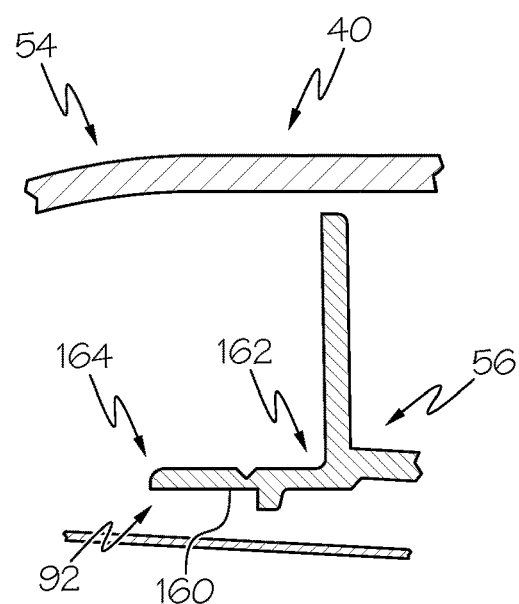
FIG. 11 depicts a section view of the side fastening arm along line 11-11 of FIG. 9.
Figure 12:
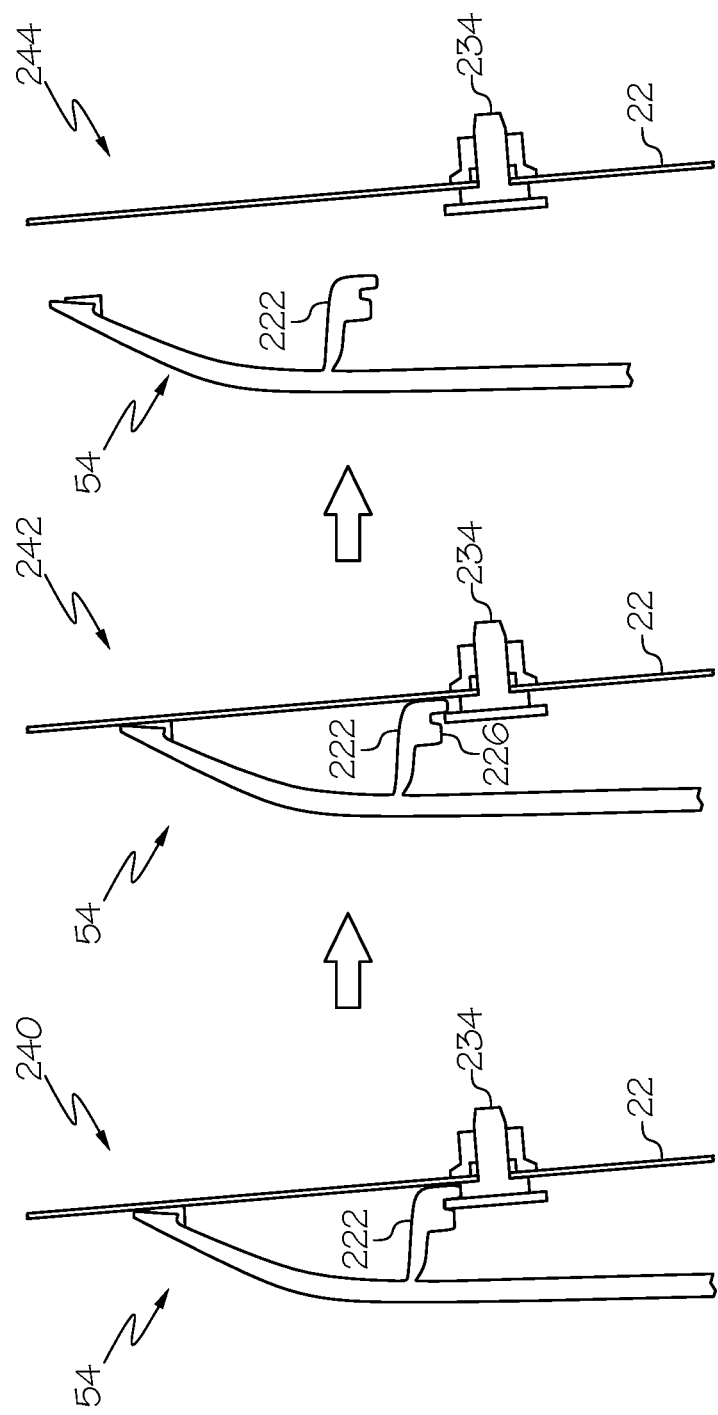
FIG. 12 illustrates operation of the cover component releasing from the hood assembly along line 12-12 of FIG. 9.

FIGS. 10-12 illustrate operation of the multi-stage detachable hood air scoop assembly 40. In FIG. 10, the intake component 56 is illustrated connected to the cover component 54 through the rear fastening arm 96. The rear fastening arm 96 includes the line of weakness 150 formed by a thinned material region that can allow the rear fastening arm 96 to separate into its connected portion 152 and free portion 154 upon application of a predetermined tensile force. Similarly, referring to FIG. 11, the intake component 56 is illustrated as being connected to the cover component 54 through the side fastening arm 92. The side fastening arm 92 includes the line of weakness 160 formed by a thinned material region that can allow the side fastening arm 92 to separate into its connected portion 162 and free portion 164 upon application of a predetermined tensile force.

FIG. 12 illustrates release of the cover component 54 from the fastener 234 upon application of a predetermined rearward force. At step 240, the catch structure 222 is illustrated engaged with the fastener 234 under normal operating conditions before a frontal impact. During a frontal impact, the cover component 54 tends to move rearward in the vehicle longitudinal direction, which causes the fastener 234 to traverse through the open end 226 of the slot structure 224 at step 242. At step 244, the catch structure 222 releases from the fastener 234 and the cover component 54 releases from the intake component 56. With the cover component 54 released from both the hood assembly 22 and the intake component 56, the cover component 54 has reduced influence, if any, on the impact loading on the hood assembly 22 during a frontal impact.

Figure 15:
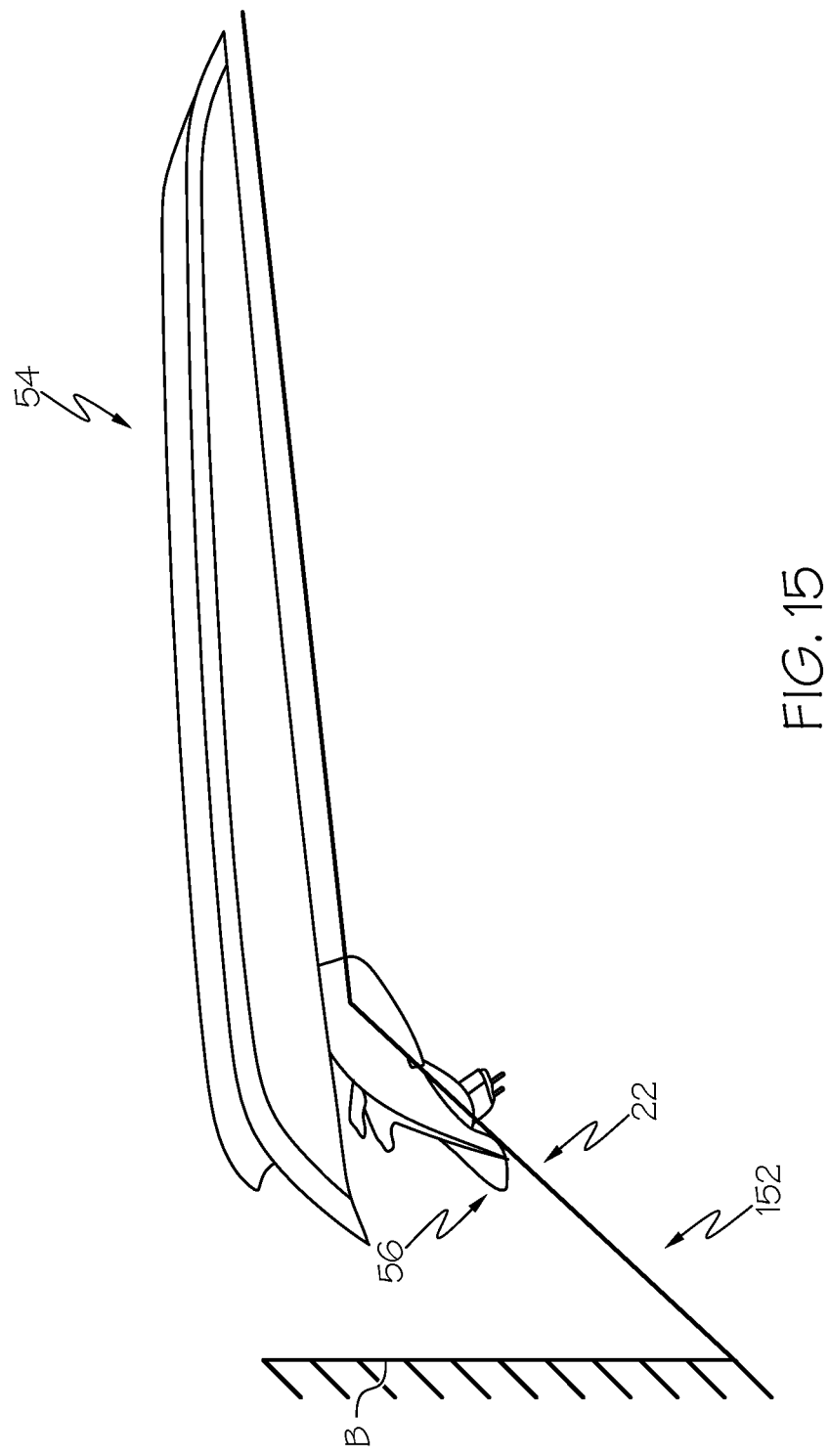
FIG. 15 illustrates operation of the multi-stage detachable hood air scoop assembly during a frontal impact event, according to one or more embodiments shown and described herein.
Figure 16:
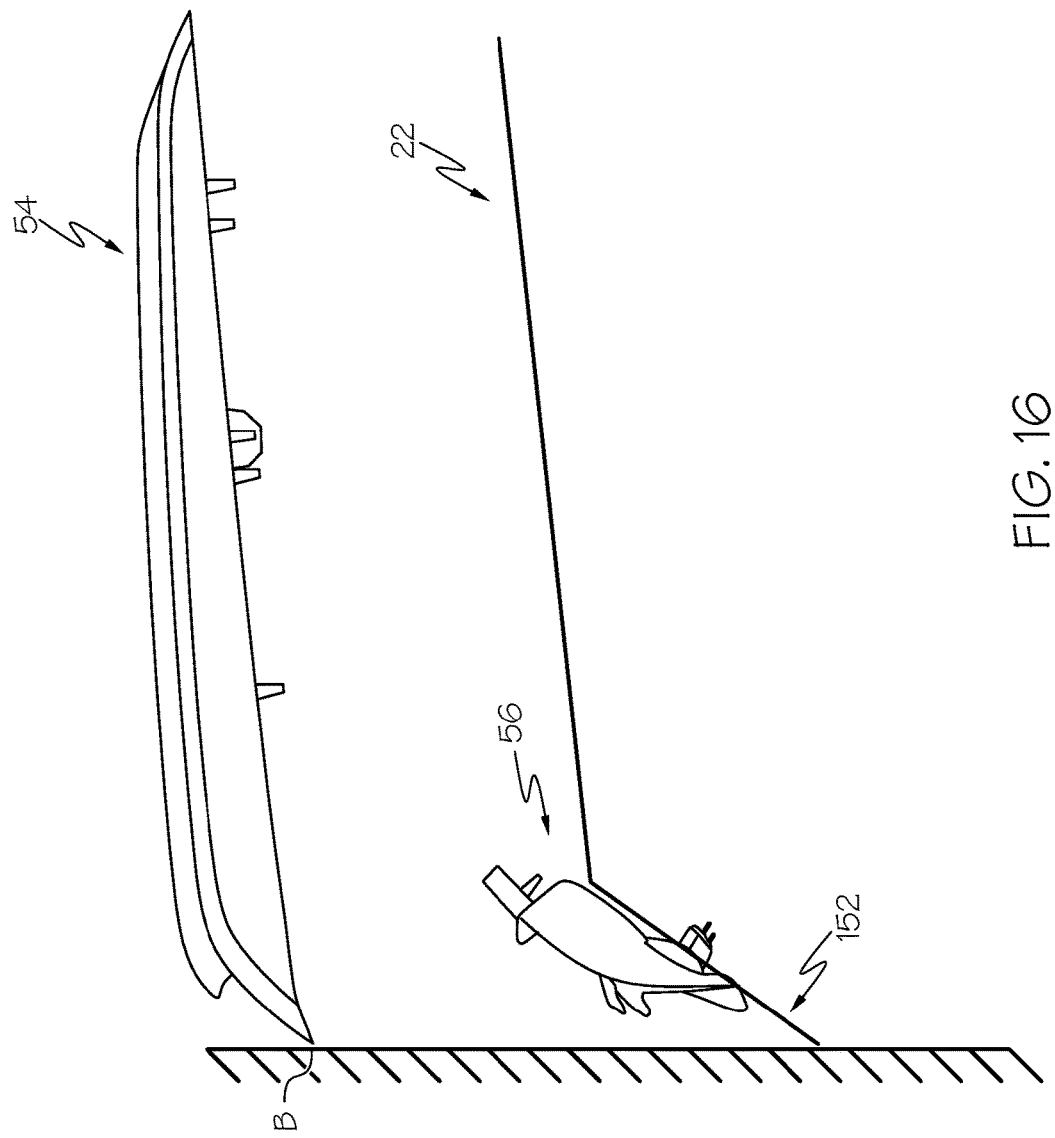
FIG. 16 illustrates operation of the multi-stage detachable hood air scoop assembly during a frontal impact event, according to one or more embodiments shown and described herein.

FIG. 13-16 further illustrate interaction between the cover component 54 and the intake component 56 during a frontal impact. Referring first to FIG. 13, the multi-stage detachable hood air scoop assembly 40 is illustrated just prior to a frontal impact with the hood assembly represented by line 22 in an original configuration. Referring to FIG. 14, as the hood assembly 22 impacts a frontal impact barrier B, a front portion 155 of the hood assembly 22 tends to buckle downwardly in the vehicle vertical direction. Because the intake component 56 is connected with the hood assembly 22 in a non-releasable fashion, the intake component 56 tends to follow the hood assembly downward relative to the cover component 54, which is also connected to the hood assembly 22 further rearward in a non-releasable fashion. FIG. 15 illustrates further bending of the hood assembly 22, particularly at the front portion 155, which causes the side and rear fastening arms to separate at their lines of weakness thereby releasing the cover component 54 from the intake component 56. Referring to FIG. 16, the cover component 54 can release from the hood assembly 22 due to a frontal force applied to the cover component 54, as described above.

The above-described multi-stage detachable hood air scoop assemblies provide a desired hood scoop structure attached to the hood assemblies that is at least partially releasable from the hood assemblies during a frontal impact event, which can reduce the influence of the hood air scoop assemblies on impact performance characteristics of the hood assemblies. The hood air scoop assemblies are multi-stage and include an intake component and a cover component. The cover component is connected both directly to the hood assembly and indirectly to the hood assembly through the intake component. The intake component is connected directly to the hood assembly and also to the cover component in a releasable fashion.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
 a hood assembly that extends over an engine compartment; and
 a multi-stage detachable hood air scoop assembly connected to the hood assembly above the engine compartment, the multi-stage detachable hood air scoop assembly comprising:
  an intake component connected directly to the hood assembly; and
  a cover component releasable connected to the intake component and directly to the hood assembly using releasable connections such that the cover component detaches from the intake component and the hood assembly in response to a predetermined front impact force;

wherein the intake component comprises a fastening arm connected to the cover component, the fastening arm having a line of weakness that separates the fastening arm into a connected portion that remains connected to the intake component and a free portion that separates from the connected portion upon application of a predetermined tensile force at the line of weakness.

2. The vehicle of claim 1, wherein the intake component is connected to the hood assembly in a non-releasable fashion using fasteners.

3. The vehicle of claim 1, wherein the line of weakness is formed as a thinned material region that extends along the fastening arm.

4. The vehicle of claim 1, wherein the intake component comprises multiple fastening arms connected to the cover component, the multiple fastening arms each having a line of weakness that separates the multiple fastening arms into connected portions that remain connected to the intake component and free portions that separate from the associated connected portions upon application of a predetermined tensile force at the lines of weakness.

5. The vehicle of claim 1, wherein the cover component has a front portion and a rear portion, the front portion connecting to the intake component and the rear portion connecting to the hood assembly.

6. The vehicle of claim 5, wherein the rear portion of the cover component has a plurality of slot structures connected to fasteners connected to the hood assembly, the plurality of slot structures having open ends that are aligned in a vehicle longitudinal direction.

7. A multi-stage detachable hood air scoop assembly that connects to a hood assembly that extends over an engine compartment of a vehicle, the multi-stage detachable hood air scoop assembly comprising:

an intake component that connects directly to the hood assembly above the engine compartment; and a cover component that releasable connects to the intake component and directly to the hood assembly above the engine compartment using releasable connections such that the cover component detaches from the intake component and the hood assembly in response to a predetermined front impact force, wherein the intake component comprises a fastening arm that connects to the cover component, the fastening arm having a line of weakness that separates the fastening arm into a connected portion that remains connected to the intake component and a free portion that separates from the connected portion upon application of a predetermined tensile force at the line of weakness.

8. The multi-stage detachable hood air scoop assembly of claim 7, wherein the intake component connects to the hood assembly in a non-releasable fashion.

9. The multi-stage detachable hood air scoop assembly of claim 7, wherein the line of weakness is formed as a thinned material region that extends along the fastening arm.

10. The multi-stage detachable hood air scoop assembly of claim 7, wherein the intake component comprises multiple fastening arms that connect to the cover component, the multiple fastening arms each having a line of weakness that separates the multiple fastening arms into connected portions that remain connected to the intake component and free portions that separate from the associated connected portions upon application of a predetermined tensile force at the lines of weakness.

11. The multi-stage detachable hood air scoop assembly of claim 7, wherein the cover component has a front portion and a rear portion, the front portion connects to the intake component and the rear portion connects to the hood assembly.

12. The multi-stage detachable hood air scoop assembly of claim 11, wherein the rear portion of the cover component has a plurality of slot structures that connect to fasteners connected to the hood assembly, the plurality of slot structures having open ends that align in a vehicle longitudinal direction.

13. A method of providing a multi-stage detachable hood air scoop assembly for a hood assembly that extends over an engine compartment of a vehicle, the method comprising:

connecting an intake component directly to the hood assembly above the engine compartment; and connecting a cover component directly to the hood assembly and the intake component above the engine compartment, the cover component being connected to the hood assembly and the intake component using releasable connections such that the cover component detaches from the intake component and the hood assembly in response to a predetermined front impact force;

wherein the intake component comprises a fastening arm that connects to the cover component, the fastening arm having a line of weakness that separates the fastening arm into a connected portion that remains connected to the intake component and a free portion that separates from the connected portion upon application of a predetermined tensile force at the line of weakness.

14. The method of claim 13 comprising connecting the intake component to the hood assembly in a non-releasable fashion.

15. The method of claim 13, wherein the cover component has a front portion and a rear portion, the front portion connects to the intake component and the rear portion connects to the hood assembly.

16. The method of claim 15, wherein the rear portion of the cover component has a plurality of slot structures that connect to fasteners connected to the hood assembly, the plurality of slot structures having open ends that align in a vehicle longitudinal direction.

17. The method of claim 13, wherein the line of weakness is formed as a thinned material region that extends along the fastening arm.

* * * * *

UNITED STATES PATENT AND TRADEMARK OFFICE
CERTIFICATE OF CORRECTION

PATENT NO. : 10,166,860 B2  
APPLICATION NO. : 15/423696  
DATED : January 1, 2019  
INVENTOR(S) : Brandon H. Hanna et al.

Page 1 of 1

It is certified that error appears in the above-identified patent and that said Letters Patent is hereby corrected as shown below:

In the Specification

In Column 05, Line 23, after "fastening", delete "aims 92" and insert --arms 92--, therefor.

In Column 06, Line 12, after "fastening", delete "aims 96" and insert --arms 96--, therefor.

In Column 06, Line 63, after "fastening", delete "aims 96" and insert --arms 96--, therefor.

Signed and Sealed this  
Ninth Day of April, 2019

Andrei Iancu  
*Director of the United States Patent and Trademark Office*